July 17, 1951        A. W. LANCASTER        2,561,060
SAFETY DEVICE FOR MINE CAGES AND THE LIKE
Filed Jan. 12, 1948        2 Sheets-Sheet 1

INVENTOR
A. W. LANCASTER
By: Featherstonhaugh & Co.
ATT'YS

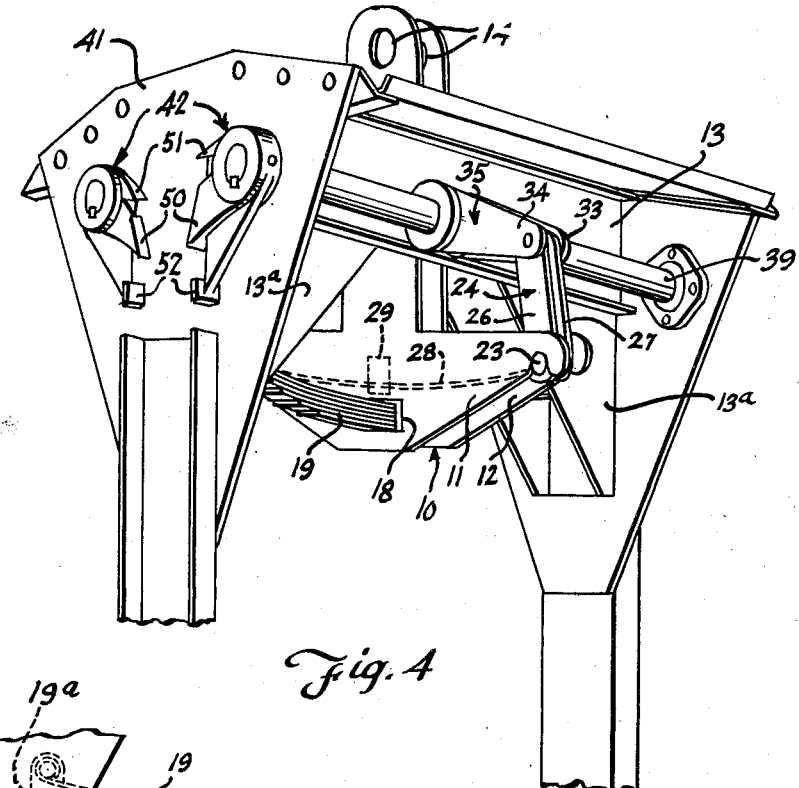
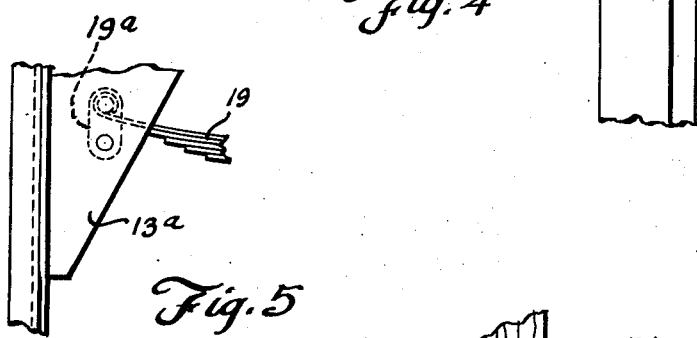
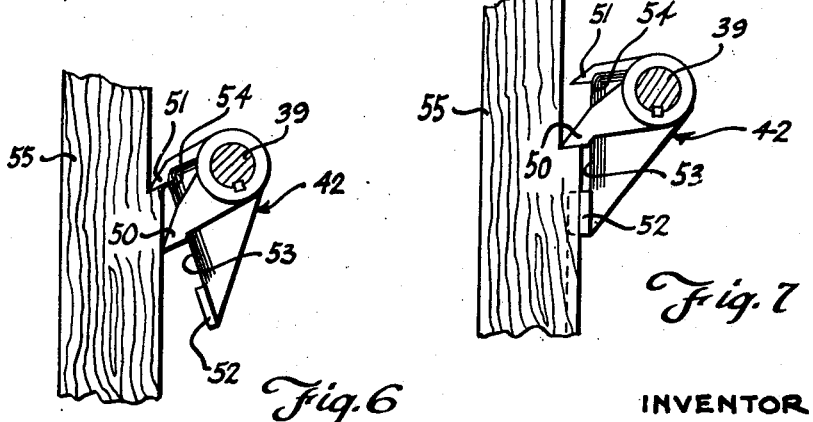

Patented July 17, 1951

2,561,060

UNITED STATES PATENT OFFICE 2,561,060

SAFETY DEVICE FOR MINE CAGES AND THE LIKE

Arthur Wesley Lancaster, Orillia, Ontario, Canada, assignor to E. Long Limited, Orillia, Ontario, Canada Application January 12, 1948, Serial No. 1,748

5 Claims. (Cl. 187—87)

This invention relates to safety devices for mine cages and more particularly to an improved hold-out mechanism for dogs.

Various devices have been in use over a long period of time which have been designed to actuate a dog mechanism to cause two pairs of dogs to bite into the timber guides of a mine shaft when the weight is released from the draw-bar due to breakage of the cable. Practically all of such devices have comprised a draw-bar system designed to compress a powerful leaf spring when the weight of the cage is taken by the cable. The draw-bar has usually been generally in the shape of an inverted T, the outer portions of the T being linked to arms keyed to a pair of dog shafts, the ends of which shafts are connected to dogs which are adapted upon the downward actuation of the arms to grip into either side of the shaft guides. Thus, when the weight of the cage is released from the draw-bar the pressure of the leaf spring causes the draw-bar to move downwardly with respect to the cage pulling the links downwardly, moving the arms on the dog shafts in a downward direction causing the dogs to bite into the shaft guides. The difficulty encountered with this type of mechanism has been that due to the positive connection between the draw-bar and the dog actuating levers any tension on the cable after it has broken, for instance, caused by fouling in the shaft causes the draw-bars to move upwardly with respect to the cage causing an upward rotation of the dog actuating levers and moving the dogs out of engagement with the shaft guides with the obvious undesirable result that the cage is once again released to continue its downward plunge.

One method which has been proposed for overcoming this type of difficulty has been to form the links with a longitudinal slot running between the points of connection on the dog actuating links and the draw-bar so that, whereas the draw-bar may pull the dog actuating links in a downward position, subsequent upward movement of the draw-bar with respect to the cage will cause the pins on the draw-bar to slide upwardly within the slot and not cause upward movement of the dog actuating levers. This type of mechanism has required a plurality of torsional springs co-axial with the dog shafts for maintaining these shafts in the upward position during normal operating conditions. Breakage of these torsional springs, however, requires complete immobilization of the cage while the dog shaft is removed and a new spring inserted to replace the broken one. Moreover, torsional springs themselves are costly to install and require a great deal of care and maintenance in addition to the difficulties encountered in replacement as above mentioned. There is also the added disadvantage in the loose link system and damage to the link itself can cause the failure of the loose link effect and also extraneous matter may possibly become lodged in the link after operation of the safety device causing a great deal of difficulty in the removal of the cage once the cable has been repaired.

The present invention eliminates the disadvantages of the loose link type of mechanism while at the same time maintaining all the advantages thereof in that the only manner in which the dogs may be disengaged when once caused to bite into the guide timbers is by actual raising of the cage and no amount of upward pull on the draw-bar can possibly effect the disengagement of the dogs until the cage has been so raised. Further, the invention provides a greatly simplified mechanism which requires a minimum of maintenance, which cannot become jammed, and the replacement of any part of which may be carried out in a very simple manner without causing the cage to be dismantled or otherwise immobilized.

According to the invention the draw-bar on the underside at the extremities of the bar of the T is provided with recesses open on the underside and adapted to fit over a pin passing through a link connected to the dog shaft actuating lever so that the pin is free to move away from the draw-bar in a downward direction without hindrance from the draw-bar. A long leaf spring is centrally connected to the draw-bar and is connected at either end to the said pins on the links. The leaf spring is much weaker than the main actuating spring but has sufficient upward tension to maintain the dog actuating levers in an upward position and the dogs in a disengaged position during the normal operation of the cage. Downward movement of the draw-bars with respect to the cage such as would occur after a cable breakage by the downward pressure of the actuating spring causes the draw-bar to carry with it the link pins and the links, rotating the dogs to the engaging position. Once the mechanism is operated and once the cage is stopped, upward tension on the cable will move the draw-bar back into its normal position compressing the actuating spring but leaving the dogs in the engaged position as the cage starts to be raised. As the cage is raised the dogs are freed and upward tension of the leaf spring connected to the pins on the links causes the links to move in an upward direction with respect to the cage, rotating the dog actuating levers and lifting the dogs to the normal operating position.

One embodiment of the invention is illustrated in the accompanying drawings in which, Figure 1 is a diagrammatic side view of the dog actuating mechanism under normal operating conditions.

Figure 4 is a perspective view of the head of the cage with the mechanism according to the invention installed, the dogs being in the engaged position, there being no tension on the draw-bar.

Figure 5 is a fragmentary side view showing the shackle connection of the actuating spring to the draw-head gussets.

Figure 6 is a detail of a specially designed dog suitable for use with the mechanism of the invention, in the incipient engaging position.

Figure 7 shows the same dog in the fully engaged position.

Figure 1:
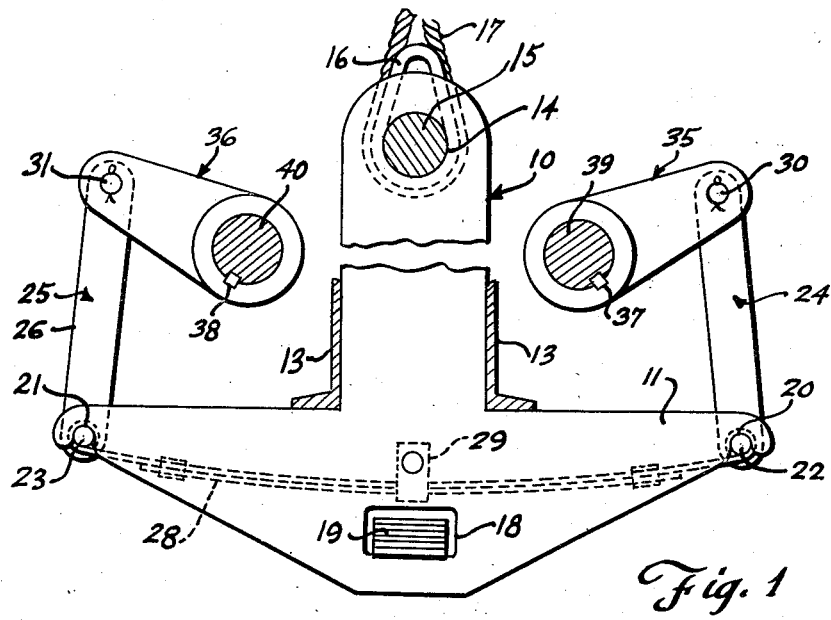

Referring now more particularly to the drawings, in the embodiment shown the device according to the invention comprises a generally T-shaped draw-bar 10 comprising the two draw plates 11 and 12 spaced apart and designed to lift the cage by upward pressure on the draw-head 13 but slidable with respect thereto. The draw-bar is formed with a draw-bar pin boring 14 into which may be secured the draw-bar pin 15 surrounded by the thimble 16 and around which passes the cable 17. The draw-bar is orificed at 18 in a manner adapted to accommodate the passage of the actuating spring 19 which is a powerful leaf spring secured at either end by shackles 19a to the draw-head gussets 13a in such a way that considerable upward displacement of the draw-bar 10 occurs when the weight of the cage is taken by the cable 17 before the draw-bar 10 bears against the draw-head 13. The outer portions of the under side of the T of the draw-bar 10 are recessed as shown at 20 and 21 to fit over pins 22 and 23 which are mounted on the links 24 and 25, the said links 24 and 25 each comprising the spaced apart link members 26 and 27. Also mounted on the pins 22 and 23 is the comparatively weak leaf spring 28 which is centrally mounted between the side plates of the draw-bar 10 by the mounting 29. The ends of the spring 28 encircle the pins 22 and 23 between the link members 26 and 27 acting as a spacer therefor. The links 24 and 25 are pivoted at their upper end on pivot pins 30 and 31, the link members 26 and 27 in each case being spaced by a spacer sleeve 32 corresponding in length to the width of the leaf spring 28. Also pivoted to the pivot pins 30 and 31 are the two side portions 33 and 34 of the forked dog actuating levers 35 and 36, the levers themselves being keyed by the keys 37 and 38 to the dog shafts 39 and 40 which are suitably mounted in the head frame 41 of the cage. To each end of each of the shafts 39 and 40 are secured the dogs 42 which are preferably of a particular design as will be hereinafter described.

Figure 2:
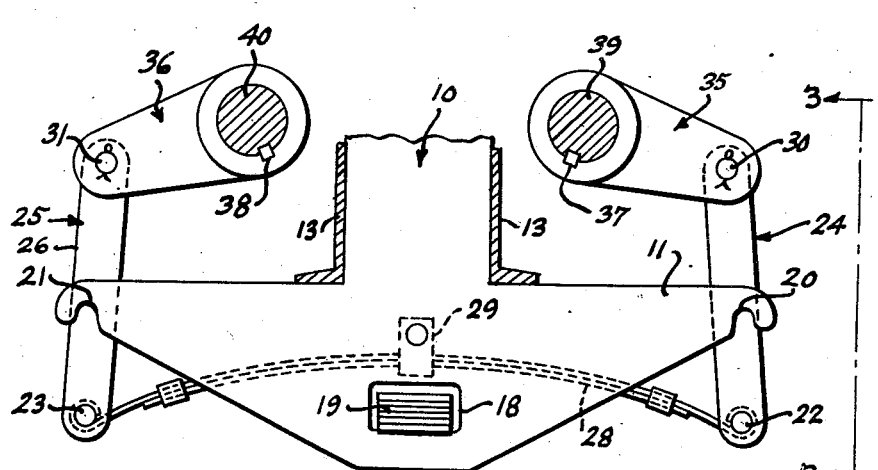
Figure 2 shows the mechanism of Figure 1 after operation of the dog mechanism and after raising of the draw-bars to the hoisting position.
Figure 3:
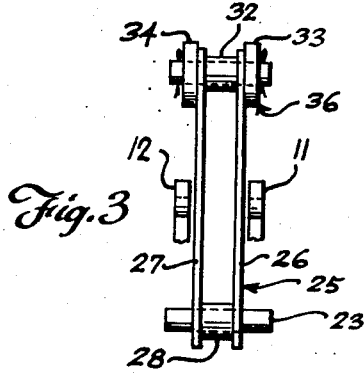
Figure 3 is a sectional view at right angles to Figure 2 taken along the line 3—3 thereof.

Dealing now with the action of the device, it will be seen that when the mechanism is in the normal operating position as shown in Figure 1, the actuating spring 19 is compressed in an upward direction in respect to the cage supported on the draw-bars by the draw-head 13. The leaf spring 28 maintains the dog actuating levers in the upward position and the pins 22 and 23 rest within the recesses 20 and 21 on the underside of the draw-bar. It is important to note at this point that the action of the leaf spring 28 is in no case opposite in effect to that of the actuating spring 19. The two springs are mutually independent, and it will be noted from the position of the spring in Figure 4 that after the actuating spring 19 has re-asserted itself to lower the draw-bar 10 with respect to the cage, the leaf spring 28 is still in the same position relative to the pins 22 and 23 as in the hoisting position shown in Figure 1. This is an important feature of the present device since in all previous mechanisms for accomplishing the same object the spring means for holding the dogs open during normal operation of the cage have acted in direct opposition to the main actuating spring, thus decreasing the efficiency thereof. When a breakage in the cable occurs or the weight of the cage is otherwise released from the cable 17, the actuating spring 19 re-asserts itself forcing the draw-bar 10 in a downward direction with respect to the cage to the position shown in Figure 4. The pins 22 and 22 are carried down within the recesses 20 and 21 of the draw-bar causing the links 24 and 25 also to move downward rotating the dog actuating levers in a downward direction, rotating the dogs 42 to a position where they will engage the shaft guides which normally occupy a position at the centre of either side of the cage between the dogs. The engagement of the dogs in the guides brings the cage to a stop and enables repairs to be made or a new cable to be connected to the draw-bar 10. When the repairs have been made and tension is again placed on the draw-bar 10, the actuating spring 19 again becomes compressed as shown in Figure 2 and the leaf spring 28 also becomes more compressed and bent around to the position shown in Figure 2. The strength of the spring 28 however is not sufficient to cause the dogs 42 to disengage the guides and the dogs remain engaged until the draw-bar 10 has raised the cage to a sufficient extent to free the dogs from their engagement. At this point, the leaf spring 28 will re-assert itself and cause the dog actuating levers 35 and 36 to rotate in an upward direction causing the dogs to assume their normal operating position.

It will be seen that once the weight of the cage has been released from the draw-bar and the actuating spring 19 has re-asserted itself there is no possible way in which the dogs may be disengaged until the cage has been actually raised. This is particularly important when it is considered that the whole weight of the cage has been taken by the new cable (and thus the new cable is in effect proven) before the dogs disengage and thus a faulty new cable or faulty connection of the new cable cannot cause the cage to plunge further down the shaft.

It is preferable although not essential to use a special type of dog in connection with the device described and this dog, illustrated in Figures 6 and 7, comprises two teeth members, a main gripping tooth 50 and an auxiliary tooth 51. The bottom extremity of the dog is provided with a stop plate 52 and between the stop plate and the main tooth and the main tooth and the auxiliary tooth are provided vertical knife edges 53 and 54 respectively. The action of the auxiliary tooth 51 is to assist the actuating spring 29 in the rotation of the dog shaft by initially engaging the guides 55 as shown in Figure 6. Chips taken by the tooth 51 which might normally jam the dog and retard its gripping action are split by the knife edge 54 and eliminated. The initial gripping of the guides by the auxiliary tooth 51 combined with the action of the actuating spring 19 rapidly turns the dog into position where the main tooth 50 thereof cuts deeply into the guides and rotation of the dog is stopped by the stop plate 52 bearing against guides as shown in Figure 7 when the lower face of the tooth 50 has assumed a position at which maximum grip is afforded. Once again any chips split away from the guides by the main tooth 50 which might cause retarding of the gripping action are split by the knife edge 53 and eliminated.

It will be observed that the whole structure of the safety mechanism described is extremely simple and requires a minimum of care and maintenance and any breakages which occur in the mechanism will be immediately apparent. Further, it will be observed that all parts of the mechanism may be easily replaced without dismantling since all parts with the exception of the dogs themselves are easily accessible from the inside of the cage.

The invention is capable of other embodiments and modifications than those shown in the drawings and it is to be understood that the invention is not to be limited by anything herein stated apart from the limitations included in the accompanying claims.

What I claim as my invention is:

1. In a safety mechanism for a mine cage of the type wherein two pairs of dogs mounted on dog shafts, to which are connected dog actuating levers adapted to be operated into engagement with shaft guides by link means in co-operation with a draw-bar of generally inverted T shape which latter is movable downwardly with respect to the cage under the influence of an actuating spring when the weight of the cage is released from the draw-bar, improved means for maintaining the dogs in a disengaged position during normal operation of the cage comprising; spring means independent of said actuating spring mounted on the draw-bar and connected to the links pivoted to said dog actuating levers continually urging said links in an upward direction, seating means on said draw-bar projections on said links for seating engagement in said seating means said spring means being designed to urge said links into seating engagement with said draw-bar during normal operation of the cage, said spring means being only of slightly greater strength than is just required to maintain the dogs in the disengaged position during normal operation of the cage, and being the sole means preventing said links from moving in a downward direction with respect to said draw-bar during normal operation of the cage.

2. A safety mechanism as defined in claim 1 in which the spring means comprises a long leaf spring centrally mounted on the draw-bar and secured at either end to the links pivoted to the dog actuating levers.

3. A safety mechanism as defined in claim 2 in which the leaf spring is attached at either end to pins passing through said links, the said pins being extended to seat, under upward pressure of said leaf spring, within recesses formed in the underside of the ends of said draw-bar.

4. A safety mechanism for mine cages comprising a draw-bar of substantially inverted T shape adapted to raise a cage by bearing against a draw-head, but movable downwardly with respect thereto, said draw-bar being formed from two spaced apart draw plates, an actuating leaf spring mounted on suitable shackles attached to the cage, passing through a central hole in said draw-bar and designed to urge said draw-bar in a downward direction away from said draw-head, a dog mechanism comprising two pairs of similar dogs mounted on parallel dog shafts and adapted upon actuation to engage the guides in the mine shaft, dog actuating levers keyed to said dog shafts and links pivotted to said dog actuating levers and adapted to be moved in a downward direction to cause actuation of said dogs upon downward movement of said draw-bar, and a long leaf spring centrally mounted on the draw-bar between the draw plates, connected at either end to said links and adapted to urge the latter in an upward direction, said latter mentioned spring being the sole means for maintaining the dogs out of engagement with the shaft guides during normal operation of the cage.

5. A safety mechanism as defined in claim 4 in which the dogs are formed with a main tooth, an auxiliary tooth, a stop plate, and vertical knife edge portions between said stop plate and said main tooth and said main tooth and said auxiliary tooth, said auxiliary tooth being adapted to engage the shaft guide as the dog shaft begins to turn under the influence of the actuating spring, after a cable breakage, to assist said actuating spring in turning the dog into the fully engaged position.

ARTHUR WESLEY LANCASTER.

REFERENCES CITED

The following references are of record in the file of this patent:

UNITED STATES PATENTS

| Number | Name | Date |
|---|---|---|
| 927,774 | Dahl | July 13, 1909 |
| 1,204,362 | Knezik | Nov. 7, 1916 |
| 1,221,754 | Lee et al. | Apr. 3, 1947 |